US007365704B2

United States Patent
Wang et al.

(10) Patent No.: US 7,365,704 B2
(45) Date of Patent: Apr. 29, 2008

(54) DRIVING CIRCUIT FOR DOUBLE DISPLAY PANEL

(75) Inventors: Ching-Tung Wang, Chupei (TW); Mao-Jung Chang, Junan Jen (TW); Hsin-Chun Ting, Yunghe (TW)

(73) Assignee: TPO Displays Corp., Chu-Nan (TW)

( * ) Notice: Subject to any disclaimer, the term of this patent is extended or adjusted under 35 U.S.C. 154(b) by 686 days.

(21) Appl. No.: 10/835,999

(22) Filed: Apr. 29, 2004

(65) Prior Publication Data
US 2004/0233155 A1 Nov. 25, 2004

(30) Foreign Application Priority Data
May 6, 2003 (TW) ................ 92112293 A

(51) Int. Cl.
G09G 5/00 (2006.01)
G09G 3/36 (2006.01)

(52) U.S. Cl. .............. 345/1.2; 345/1.1; 345/3.1; 345/204; 345/211; 345/214

(58) Field of Classification Search .......... 345/1.1, 345/3.1, 3.2, 3.3, 3.4, 204, 214, 1.2, 211
See application file for complete search history.

(56) References Cited

U.S. PATENT DOCUMENTS

| | | | | |
|---|---|---|---|---|
| 5,488,385 | A * | 1/1996 | Singhal et al. | 345/3.1 |
| 6,215,459 | B1 * | 4/2001 | Reddy et al. | 345/3.1 |
| 6,628,243 | B1 * | 9/2003 | Lyons et al. | 345/1.1 |
| 2004/0263424 | A1 * | 12/2004 | Okuley | 345/1.1 |

* cited by examiner

Primary Examiner—My-Chau T. Tran
(74) Attorney, Agent, or Firm—Liu & Liu

(57) ABSTRACT

A driving circuit for a double display panel is disclosed. The driving circuit drives a first display panel and a second display panel, and includes an ASIC and two pairs of driving ports. The ASIC outputs a driving signal pair including two signals which are opposite in phase to each other. A first pair of driving ports electrically connected to the first display panel and the ASIC, receiving the driving signal pair to determine whether to activate the first display panel or not. A second pair of driving ports electrically connected to the second display panel and the ASIC, receiving the driving signal pair to determine whether to activate the second display panel or not. The driving signal pair determining the activation of the first and second display panel is the same for both panels, and only one of the display panels can be activated at a time.

16 Claims, 4 Drawing Sheets

DRIVING CIRCUIT FOR DOUBLE DISPLAY PANEL

CROSS-REFERENCE TO RELATED APPLICATION

This application claims the priority benefit of Taiwan application serial no. 92112293, filed on May 6, 2003.

BACKGROUND OF THE INVENTION

1. Field of Invention

The present invention relates to a driving circuit for a display panel, and more particularly, to a driving circuit for a double (dual) display panel.

2. Description of Related Art

In order to accommodate the fast growing requirement of having a display panel receiving a large amount of data with a versatile information, the electronic components within the personal electronic products, e.g. the mobile phone or the personal computer, have gradually been changing to the utilization of a new dual-screen mobile phone or the multi-screen personal computer which are now commonly used in the current market. Consequently, moving away from the earlier standard specification where only one display panel was used.

Generally speaking, the driving circuit for driving such multi-display panel have a timing bus and a data bus for each different display panels to provide the control instruction and the data required for the display. For example, as shown in FIG. 1, in order to control a display panel 110 and a display panel 120 using only one Application Specific Integration Circuit (ASIC) 100, timing buses 112 and 122 and a data buses 114 and 124 must respectively provide a related control instructions and display data to the display panels 110, and 120 accordingly. However, it is apparent that in order to achieve all the required functions, the ASIC 100 must have more pins, making the packaging and the design of the Integrated Circuit (IC) even more difficult. Accordingly, it is desirable to have a circuit for driving two display panels with an ASIC having less number of pins.

SUMMARY OF THE INVENTION

The present invention provides a driving circuit that uses a common output to control two display devices having similar input control signal protocol or format. In one aspect, the present invention provides a driving circuit for a double display panel using a common output port, which is coupled to and shared by the display panels. The display panels may be similar in design with respect to their input control signal protocol and/or format. The driver is structured and configured such that it responds to a selection of one of the display panels to be targeted for display, and outputs a signal that is configured and that can be discriminated between the display panels such that the targeted display panel would recognize or react to the output signal while the non-targeted display panel would not react to the output signal. In another aspect of the present invention, the display panels and/or the connections between the display panels and the shared driver output port may be configured in a complementary manner to allow the display panels to be compatible with the driver output.

In one embodiment, the driver comprises an ASIC, which outputs a driving signal pair including two signals which are opposite in phase to each other. A first pair of driving ports electrically connected to the first display panel and the ASIC, receiving the driving signal pair to determine whether to activate the first display panel or not. A second pair of driving ports electrically connected to the second display panel and the ASIC, receiving the driving signal pair to determine whether to activate the second display panel or not. The driving signal pair which activate the first or the second display panels is the same for both panels and only one of the display panels can be activated at a time.

In accordance with another embodiment of the present invention, the first pair of driving ports and the second pair of driving ports both comprise a first driving port and a second driving port. Moreover, the driving signal pair comprises a first driving signal and a second driving signal which are opposite in phase to each other. The first driving signal is input to the first driving port of the first pair of driving ports and the second driving port of the second pair of driving ports. Whereas, the second driving signal is input to the second driving port of the first pair of driving ports and the first driving port of the second pair of driving ports. As such, the signal received by the second display panel is inverted with respect to the signal received by the first display panel.

In accordance with another embodiment of the present invention, the first driving port and the second driving port of the second pair of driving ports are respectively electrically connected to one of two inverters, so as to receive the output from the inverter. In this embodiment, the first driving signal is input into the first driving port of the first pair of driving ports and the inverter which is electrically connected to the first driving port of the second pair of driving ports, and the second driving signal is input into the second driving port of the first pair of driving ports and the inverter which is electrically connected to the second driving port of the second pair of driving ports. Accordingly, the signal received by the second display panel is inverted with respect to the signal received by the first display panel.

Furthermore, in according with another embodiment of the present invention provides a driving circuit for a double display panel for driving the first display panel and the second display panel. The driving circuit for a double display panel comprises two enabling ports, an inverter, and an ASIC. The ASIC outputs an enabling signal to the first enabling port of the enabling ports and the inverter. The first enabling port determines whether to activate the operation of the first display panel or not according to the received signal. The inverter receives the signal for determining whether to activate the second display panel or not, and outputs the inverse of the received signal to the second enabling port, where the inverted signal determines whether the operation of the second display panel should be activate or not. Accordingly, the second display panel receives a signal that is inverted with respect to the signal received by the first display panel.

Further, the first and second panels may be of the same design, including a jumper or other types of switching element that enable selection or engagement, at the time of manufacturing of the device (e.g., a cell phone) having the two panels, of the functional component to distinguish between the functions of the two panels.

In summary, by this special circuit design, the signal output from the same set of pins according to the present invention is able to activate a different panel for performing its operation in different timing, thus only one set of timing bus and data bus is required to support the normal operation of two display panels. Therefore, when compared to the prior art, which needs two sets of timing bus and data bus, the number of the pins required for the ASIC of the present invention is apparently reduced.

BRIEF DESCRIPTION OF THE DRAWINGS

The accompanying drawings are included to provide a further understanding of the invention, and are incorporated in and constitute a part of this specification. The drawings illustrate preferred embodiments of the invention, and together with the description, serve to explain the principles of the invention.

DESCRIPTION OF THE PREFERRED EMBODIMENTS

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

Figure 1:
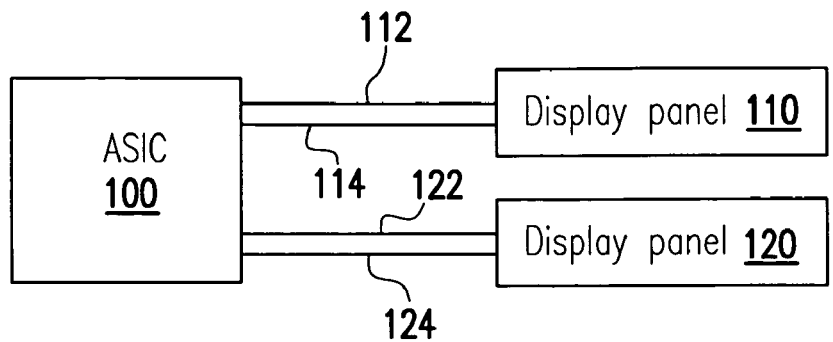
FIG. 1 is a schematic block diagram of a circuit in which an ASIC is used to drive two display panels in the prior art.
Figure 2A:
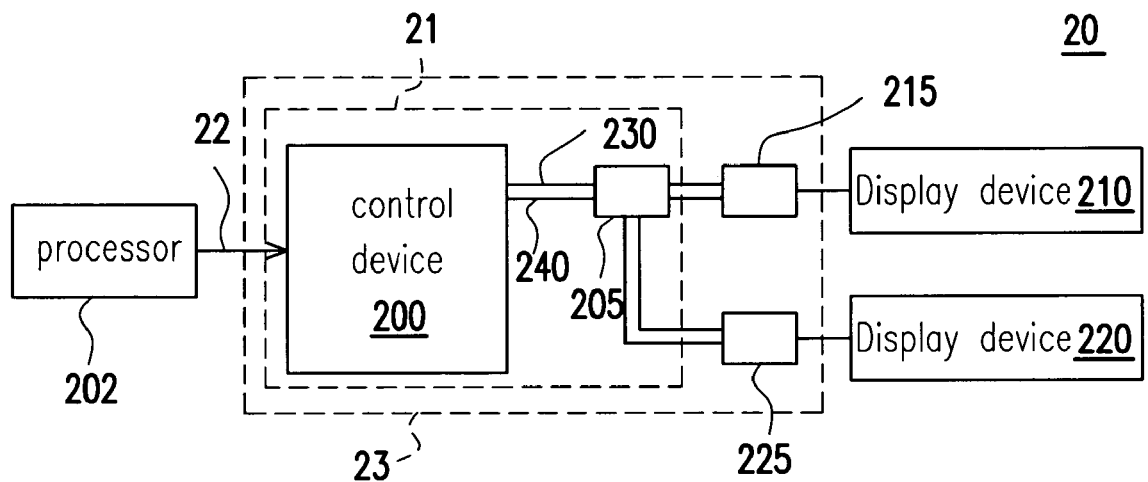
FIG. 2A is a schematic block diagram of an electronic device in accordance with one embodiment of the present invention.
Figure 2B:
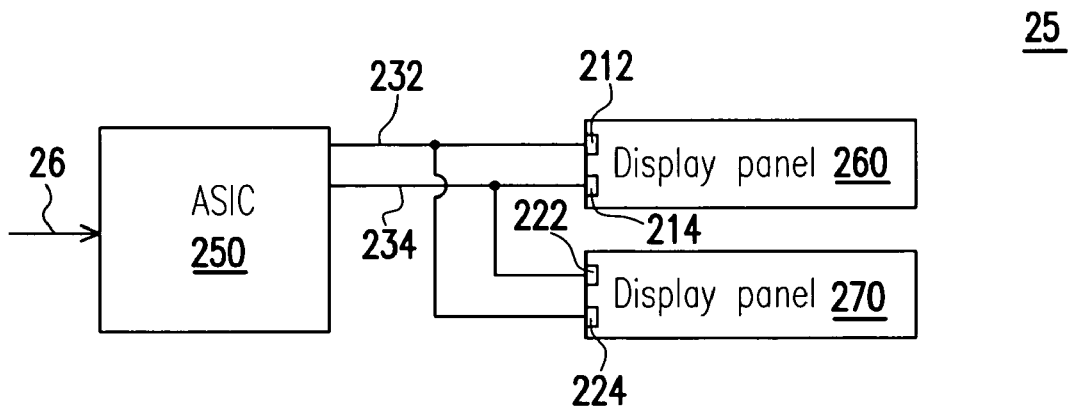
FIG. 2B is a schematic block diagram of a circuit in accordance with one embodiment of the present invention.

FIG. 2A is a schematic block diagram of an electronic device 20 in accordance with one embodiment of the present invention. The electronic device 20 includes a processor 202 and a display system including a driving circuit 23 and two display devices 210 and 220. The processor 202 provides data and/or commands through signal line 22 to the driving circuit 23. The driving circuit 23 includes a control circuit 21, which comprises a control device 200 and a common output port 205, and two driving port sets 215 and 225 for transmitting a control signal from the common output port 205 to the display devices 210 and 220, respectively. As shown in FIG. 2B, the control circuit 21 can be an ASIC 250. Alternatively, the control circuit 21 can be implemented by other hardware and/or firmware, such as processors, controllers, EPROMs, and/or by software. The common output port 205 can include a timing bus 230 and a data bus 240 common to or shared by the first and second display devices 210 and 220 as shown in FIG. 2B. In response to data transmitted from signal line 22, the control device 200 selects a target display device from one of the first and second display devices 210 and 220. The control circuit 21 controls the display operation of the first display device 210 and the second display device 220 selectively through the shared or common timing bus 230 and data bus 240. The first and second display devices 210 and 220 can be any display devices well known in the art and suited for the particular application, such as CRT or flat display panel.

Figure 3A:
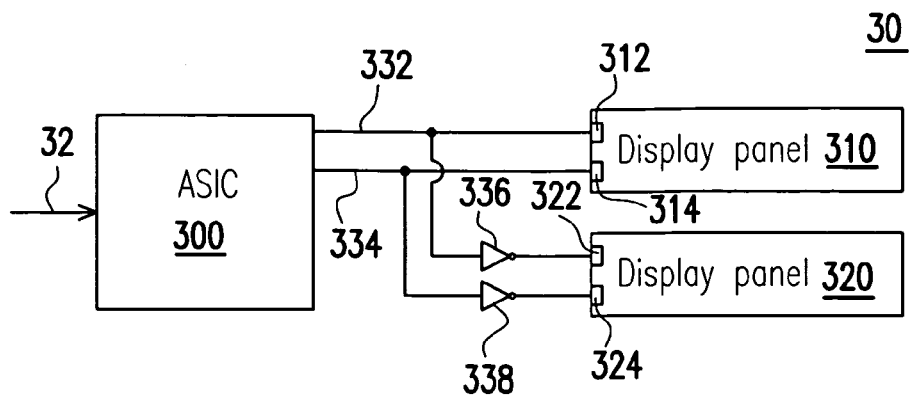
FIG. 3A is a schematic block diagram of a circuit of another embodiment of the present invention.
Figures 4A, 4B, 4C:
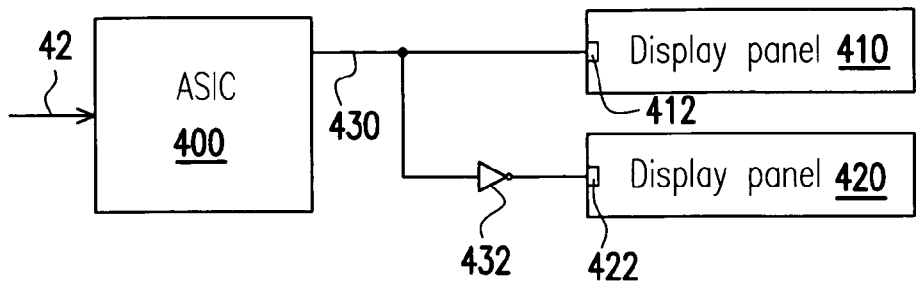
FIG. 4A is a schematic block diagram of a circuit of another embodiment of the present invention.
FIG. 4B and FIG. 4C are the schematic timing diagrams illustrating the enabling signals and the signals received by each enabling port in FIG. 4A.

In the embodiments of FIGS. 2B, 3A and 4A, the two display panels within each embodiment are of similar design with respect to input control signal protocol and/or format. They do not have to be of the same size, structure, or performance characteristics. In other words, the two display panels may be interchanged and they remain operational with the driver without modifications to the circuit. Without the present invention, the two display panels would not be able to discriminate which of the driver output signals received from the common output port are intended for which display panel. In accordance with one aspect of the present invention, the driver and/or the connections coupling the driver to the display panels are configured to allow the display panels to passively discriminate the intended control signal received from the common output port.

FIG. 2B is a schematic block diagram of a circuit 25 in accordance with another embodiment of the present invention. The circuit 25 includes the ASIC 250, the first and second display panels 260 and 270, and shared signal transmission lines 232 and 234, wherein the signal transmission lines 232 and 234 may be part of common timing bus 230 as shown in FIG. 2A. The ASIC 250 is capable of sending a first driving signal via the line 232 and a second driving signal via the line 234, wherein the driving signal pair determines whether the first and second display panels 260 and 270 should be activated or not. Further, the first display panel 260 includes a first pair of driving ports 212 and 214, and the second display panel 270 includes a second pair of driving ports 222 and 224. The transmission lines 232 and 234 couple the ASIC 250 to the first and second pairs of driving ports. The first display panel 260 receives a driving signal pair via the signal transmission lines 232 and 234 at the first pair of driving ports 212 and 214, which forms driving port set 215 shown in FIG. 2A. Likewise, the second display panel 270 receives a driving signal pair via signal transmission lines 232 and 234 at the second pair of driving ports 224 and 222, which forms the driving port set 225 shown in FIG. 2A.

Moreover, in order to adapt to the general display panel used in the current market, the driving signals herein for activating the first display panel 260 and the second display panel 270 are the same for both panels. However, in order to avoid a display error caused by the fact that both display panels 260 and 270 simultaneously receive the driving signal pair on the timing bus 230 and/or the data bus 240, the ASIC 250 outputs a set of driving signal pair via the shared pair of signal transmission lines 232 and 234 into the first pair of driving ports 212 and 214 of the first display panel 210, then another set of driving signal pair is input in an inverted manner into the second pair of driving ports 222 and 224 of the second display panel 270. In other words, a first driving signal output from the signal transmission line 232 is simultaneously sent to the first driving port 212 of the first pair of driving ports and to the second driving port 224 of the second pair of driving ports; whereas a second driving signal output from the signal transmission line 234 is simultaneously sent to the second driving port 214 of the first pair of driving ports and to the first driving port 222 of the second pair of driving ports.

Figure 2C:
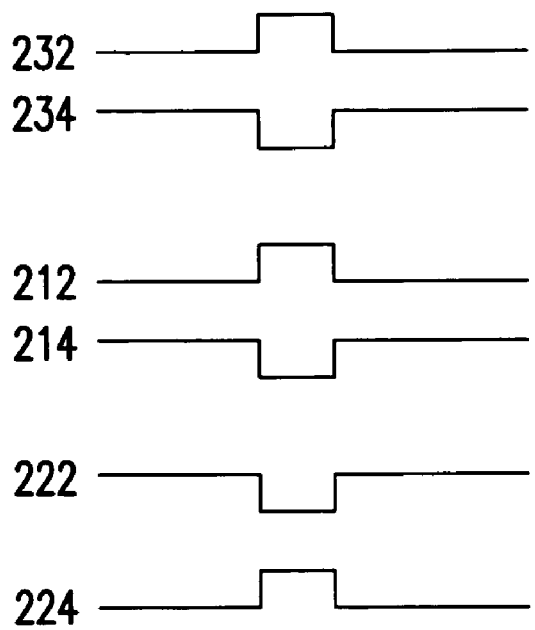
FIG. 2C and FIG. 2D are the schematic timing diagrams illustrating the driving signal pair and the signals received by each pair of driving ports in FIG. 2B.
Figure 2D:
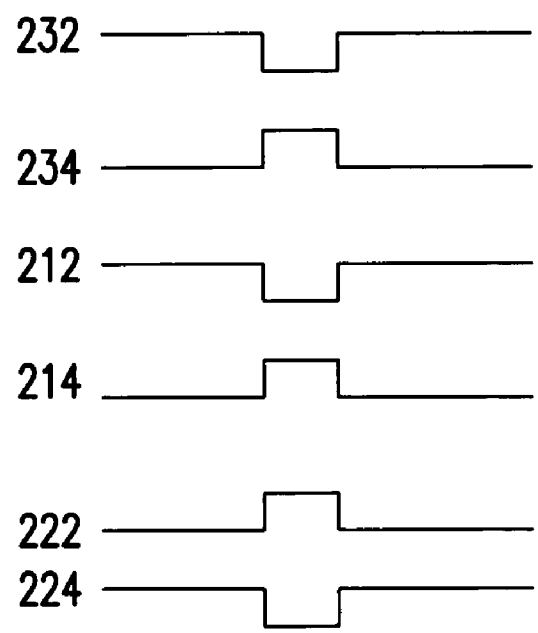

The relationship between the driving signal pairs and the signals received by the first pair of driving ports 212 and 214 of the first display panel 210, and second pair of driving ports 222 and 224 of the second display panel 220 mentioned above, are further described hereinafter making references to FIG. 2C and FIG. 2D. FIG. 2C and FIG. 2D are schematic timing diagrams illustrating examples of a driving signal pair and the signals received by each pair of driving ports in FIG. 2B. First, both the first display panel 260 and the second display panel 270 simultaneously receive the first and second driving signals from the signal transmission lines 232 and 234 as those shown in FIG. 2C. Furthermore, only when one of the first driving ports (including the first driving ports 212 and 222) in the pair of the driving ports receives a high potential pulse, and also when one of the second driving ports (including the second driving ports 214 and 224) receives a low potential pulse, the corresponding display panel activates and responds to the subsequent data on the timing bus 230 and the data bus 240. The ASIC 250 determines which signal pair to output to selectively control the respective display panels, in response to an external command 26 representing the selection of the targeted display panel (e.g., a control signal indicating the selection of one of the two display panels when the cover of a cell phone is flipped open).

Certainly, it will be apparent to one of the ordinary skill in the art that exchanging the potential required for driving two driving ports of a display panel is still suitable for the present invention.

As shown in FIG. 2C, since the first driving port 212 in the first pair of driving ports receives the high potential pulse and the second driving port 214 receives the low potential pulse, the first display panel 260 activates and displays the various information according to the subsequent signals on the timing bus 230 and the data bus 240. In contrast, since the first driving port 222 in the second pair of driving ports receives the low potential pulse and the second driving port 224 receives the high potential pulse, the second display panel 270 does not respond to the subsequent signals on the timing bus 230 and the data bus 240.

In contrast, as shown in FIG. 2D, since the signal transmission line 232 outputs the low potential pulse, and the signal transmission line 234 outputs the high potential pulse, the first driving port 222 in the second pair of driving ports receives the high potential pulse and the second driving port 224 receives the low potential pulse, the second display panel 270 activates and displays the various information according to the subsequent signals on the timing bus 230 and the data bus 240. Whereas, since the first driving port 212 in the first pair of driving ports, in this case, receives the low potential pulse and the second driving port 214 receives the high potential pulse, the first display panel 260 does not respond to the signals on the timing bus 230 and the data bus 240.

FIG. 3A is a schematic block diagram of a circuit 30 in accordance with another embodiment of the present invention. The circuit includes an ASIC 300, first and second display panels 310 and 320, and signal lines 332 and 334. The first display panel 310 includes a first pair of first and second driving ports 312 and 314, and the second display panel 320 includes a second pair of first and second driving ports 322 and 324. The ASIC 300 determines which signal pair to output to selectively control the respective display panels, in response to an external command 32 representing the selection of the targeted display panel. The first display panel 310 receives a driving signal pair via the signal transmission lines 332 and 334 at the first pair of driving ports 312 and 314, respectively, wherein the driving signal pair determines whether the first display panel 310 should activate or not. Likewise, the second display panel 320 receives the driving signal pair via the signal transmission lines 332 and 334 at the second pair of driving ports 322 and 324, respectively, wherein the driving signal pair determines whether the second display panel 320 should activate or not.

Similarly, in order to adapt to the general display panel used in the current market, the driving signals herein for activating the first display panel 310 and the second display panel 320 are the same for both panels. However, in order to avoid a display error caused by the fact that both the display panels 310 and 320 simultaneously receive the first and second driving signals on the timing bus and the data bus, the ASIC 300 outputs a driving signal pair via the pair of signal transmission lines 332 and 334 to the first pair of driving ports 312 and 314 of the first display panel 310 in the present embodiment; while the driving signal pair is sent to inverters 336 and 338, which invert the first and second driving signals respectively, before sending the driving signal pair to the second display panel 320. Consequently, by inverting the driving signal pair through the inverters 336 and 338 before being received by its corresponding pair of driving ports (in the present embodiment, it is the second pair of driving ports 322 and 324 respectively), the display error is avoided.

Figure 3B:
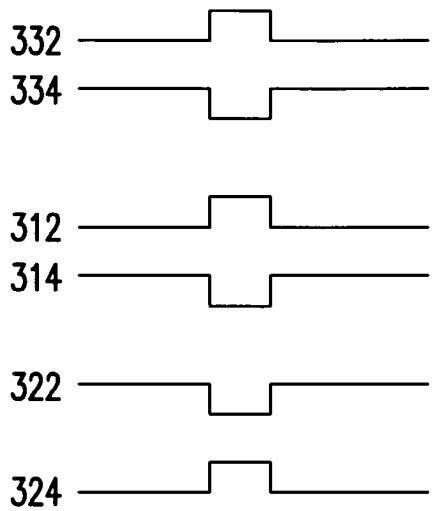
FIG. 3B and FIG. 3C are the schematic timing diagrams illustrating the driving signal pair and the signals received by each pair of driving ports in FIG. 3A.
Figure 3C:
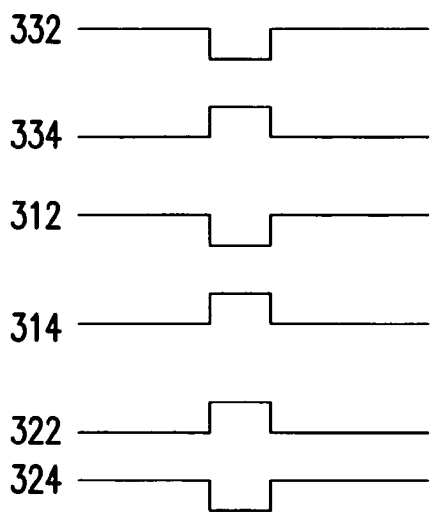

The relationship between the driving signal pair and the signals received by the first pair of driving ports 312 and 314 of the first display panel 310 and the second pair of driving ports 322 and 324 of the second display panel 320 mentioned above, are further described hereinafter making references to FIG. 3B and FIG. 3C. FIG. 3B and FIG. 3C are schematic timing diagrams illustrating examples of a driving signal pair and the signals received by each pair of driving ports in FIG. 3A. First, only when one of the display panels 310 or 320 receive the appropriate driving signal pair from the signal transmission lines 332 and 334 as shown in FIG. 3B, that only one display panel will respond to the subsequent data on the timing bus and the data bus. In other words, only when one of the first driving ports (including the first driving ports 312 and 322) in the pair of the driving ports respectively corresponding to the first display panel 310 and the second display panel 320 receive a high potential pulse, and also when one of the second driving ports (including the second driving ports 314 and 324) receive a low potential pulse at the same time, that the corresponding display panel 310 or the display panel 320 activates and performs the display operation. Certainly, it will be apparent to one of the ordinary skill in the art that exchanging the potential required for driving two driving ports of the display panel is still suitable for the present invention.

For example, as shown in FIG. 3B, the ASIC 300 is sending a high potential pulse via the first signal line 332 and a low potential pulse via the second signal line 334. Since the driving port 312 in the first pair of driving ports receives the high potential pulse and the driving port 314 receives the low potential pulse, the first display panel 310 activates and displays the various information according to the subsequent signals on the timing bus and the data bus. The signal pair is inverted at the inverters 336 and 338 before reaching the second pair of driving ports 322 and 324. In contrast, since the first driving port 322 of the second pair of driving ports receives the low potential pulse, and the second driving port 324 of the second pair of driving ports receives the high potential pulse, the display panel 320 does not respond to the signals on the timing bus and the data bus.

In contrast, as shown in FIG. 3C, the ASIC 300 sends a low potential pulse via the line 332 and a high potential pulse via the line 334. The signal pair is inverted at the inverters 336 and 338 before reaching the second pair of driving ports 322 and 324. When the signal transmission line 332 outputs the low potential pulse, and the signal transmission line 334 outputs the high potential pulse, the first driving port 322 in the second pair of driving ports receives the high potential pulse, and the second driving port 324 of the second pair of driving ports receives the low potential pulse, the display panel 320 activates and displays the various information according to the subsequent signals on the timing bus and the data bus. In contrast, since the first driving port 312 in the first pair of driving ports receives the low potential pulse and the second driving port 314 receives the high potential pulse, the display panel 310 does not respond to the signals on the timing bus and the data bus.

FIG. 4A is yet another schematic block diagram of a circuit 40 in accordance with another embodiment of the present invention. The display panel 410 activates its display operation or not according to the signals received by the enabling port 412. Likewise, the display panel 420 activates its display operation or not according to the signals received by the enabling port 422. However, in order to avoid a display error caused by the fact that both the display panel 410 and the display panel 420 are simultaneously receiving the signals on the timing bus and the data bus, the enabling signal output from the ASIC 400 via the signal transmission line 430 is directly sent to the first enabling port (in the present embodiment, it is the enabling port 412) of the first display panel (i.e. the display panel 410), and an inverted signal generated by the inverter 432 is sent to the second enabling port (in the present embodiment, it is the enabling port 422) that is electrically connected to the second display panel.

The enabling signals output by ASIC 400 is determined by ASIC 400 according to an external command 42. The relationship between the enabling signals and the signals received by the enabling ports 412 and 422 mentioned above are further described hereinafter making references FIG. 4B and FIG. 4C. As shown in FIG. 4B, when the enabling signal output from the signal transmission line 430 is at high potential, the enabling port 412 receives an enabling signal having the same high potential. However, since the enabling signal is sent to the enabling port 422 through the inverter 432, the signal received by the enabling port 422 is a low potential signal. Similarly, as shown in FIG. 4C, when the enabling signal output from the signal transmission line 430 is at low potential, the enabling port 412 receives an enabling signal having the same low potential, and the signal received by the enabling port 422 is a high potential signal. Therefore, the display panel 410 and the display panel 420 do not respond to the signals on the timing bus and the data bus simultaneously, so that a display error is avoided.

In a further embodiment, the first and second display panel may be configured with respect to each other to react differently to the signal received from the common output from the driver. For example, one of the two display panels may be configured internally to reacted in an inverted manner to the received signal, such as by including a built-in inverter at the driving port.

In summary, the present invention provides a circuit configuration that is able to simultaneously control two display panels with a set of timing bus and the data bus without causing a repeatedly display error. Therefore, the invention allows a reduction of the number of pins required by the ASIC and also reduces the packaging cost and simplifies the design.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A driving circuit for driving a first display panel and a second display panel, comprising:
   a control circuit for outputting a driving signal pair including two signals which are opposite in phase to each other;
   a first pair of driving ports electrically connected to the first display panel and the control circuit for receiving the driving signal pair;
   a second pair of driving ports electrically connected to the second display panel and the control circuit for receiving the driving signal pair; and
   two inverters, wherein the first pair of driving ports and the second pair of driving ports both comprise a first driving port and a second driving port, and the first driving port and the second driving port of the second pair of driving ports electrically connect to one of the inverters, so as to receive outputs from the inverters.

2. The driving circuit for the double display panel of claim 1, wherein the driving signal pair comprises a first driving signal and a second driving signal that are opposite in phase to each other, and the first driving signal is input into the first driving port of the first pair of driving ports and the inverter electrically connected to the first driving port of the second pair of driving ports, and the second driving signal is input into the second driving port of the first pair of driving ports and the inverter electrically connected to the second driving port of the second pair of driving ports.

3. The driving circuit for the double display of claim 1, wherein the control circuit is implemented by at least one of ASIC (Application Specific Integration Circuit), processor, controller, EPROM (Erasable Programmable Read Only Memory), and/or software.

4. A driving circuit for a double display panel for driving a first display panel and a second display panel, comprising:
   a first pair of enabling ports for determining whether to activate the operation of the first display panel or not;
   a pair of inverters for determining whether to activate the second display panel or not;
   a second pair of enabling ports electrically connected to output terminals of the pair of inverters and the second display panel; and
   a control circuit for outputting an enabling signal to the first pair of enabling ports and the pair of inverters,
   wherein the second pair of enabling ports electrically connects to the pair of inverters, so as to receive outputs from the pair of inverters.

5. The driving circuit of claim 4, wherein the control circuit is implemented by at least one of ASIC (Application Specific Integration Circuit), processor, controller, EPROM (Erasable Programmable Read Only Memory), and/or software.

6. A control circuit for controlling a first and second display panels, comprising:
   A pair of common output ports that provides an output to the first and second display panels;
   a control device that provides the pair of common output ports a first and a second signals intended for the first and second display panels respectively, wherein the first and second signals are different to the extent that the first signal can be recognized by the first display panel and the second signal can be recognized by the second display panel; and a pair of inverters electrically connects to the pair of common output ports and the second display panel, wherein the second display panel receive output from the pair of inverters.

7. The control circuit as in claim 6, wherein the first signal is inverted with respect to the second signal.

8. An electronic device, comprising:

first and second display panels;

a driving circuit, providing a first and second control signals to the first and second display panels via a pair of common ports, wherein the first and second control signals are different to the extent that the first control signal can be recognized by the first display panel and the second control signal can be recognized by the second display panel;

a pair of inverters electrically connects to the of common output ports and the second display panel, wherein the second display panel receives the output from the pair of inverters; and a processor providing display data to the driving circuit.

9. A display system, comprising:

first and second display devices, wherein the first and second display devices are similar with respect to input control protocol and format;

a driving circuit, providing a control signal to the first and second display devices via a pair of common output ports; and a pair of inverters electrically connects to the pair of common output ports and the second display panel, wherein the second display panel receives output from the pair of inverters, wherein the control signal is structured in a manner to selectively control one of the first and second display devices via the pair common output ports and the first and second display devices are operatively coupled to the pair of common output ports in a manner complementary to the structure of the control signal, to allow the first and second display devices to passively discriminate which display device the control signal is intended for.

10. The driving circuit for the double display panel of claim 1, wherein the first display panel and the second display panel are similar with respect to input control protocol and/or format.

11. The driving circuit for the double display panel of claim 1, wherein the same driving signal pair is accessible to both first and second display panels, wherein the first and second display panels discriminate when the driving signal pair is intended for the respective panels, such that the first and second display panels can be selectively controlled for display.

12. The driving circuit for the double display panel of claim 4, wherein the first display panel and the second display panel are similar with respect to input control protocol and/or format.

13. The driving circuit for the double display panel of claim 4, wherein the same enabling signal is accessible to both first and second display panels, wherein the first and second display panels discriminate when the enabling signal pair is intended for the respective panels, such that the first and second display panels can be selectively controlled for display.

14. The driving circuit for the double display panel of claim 13, wherein the control circuit selectively controls the first and second display panels based on the enabling signal.

15. The driving circuit as in claim 6, wherein the first and second display panels are similar with respect to input control protocol and/or format.

16. The driving circuit for the double display panel of claim 15, wherein the same first and second signals are accessible to both first and second display panels, wherein the first and second display panels discriminate when the first and second signals are intended for the respective panels, such that the first and second display panels can be selectively controlled for display based on the first and second signals.

* * * * *